(12) United States Patent
Hoetzel et al.

(10) Patent No.: US 7,095,362 B2
(45) Date of Patent: Aug. 22, 2006

(54) RADAR MEASUREMENT DEVICE, ESPECIALLY FOR A MOTOR VEHICLE, AND METHOD FOR OPERATING A RADAR MEASUREMENT DEVICE

(75) Inventors: Juergen Hoetzel, Florstadt (DE); Dirk Schmid, Simmozheim (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/517,790

(22) PCT Filed: Jun. 17, 2003

(86) PCT No.: PCT/DE03/02006

§ 371 (c)(1),
(2), (4) Date: Dec. 13, 2004

(87) PCT Pub. No.: WO2004/025322

PCT Pub. Date: Mar. 25, 2004

(65) Prior Publication Data

US 2005/0225476 A1    Oct. 13, 2005

(30) Foreign Application Priority Data

Sep. 6, 2002 (DE) .............................. 102 41 463

(51) Int. Cl.
*G01S 13/42* (2006.01)
(52) U.S. Cl. .................. 342/70; 342/83; 342/84; 342/85; 342/109; 342/127
(58) Field of Classification Search ............ 342/70–72, 342/82–88, 109–115, 127–137
See application file for complete search history.

(56) References Cited

U.S. PATENT DOCUMENTS 3,715,753 A    2/1973    Applebaum et al. ........ 342/127

(Continued)

FOREIGN PATENT DOCUMENTS

WO    98/04930    2/1998

(Continued)

OTHER PUBLICATIONS

"Multifunctional radar sensor for automotive application", IEEE Transactions on Microwave Theory and Techniques, May 1998, vol. 46, No. 5, p. 701-8, Wollitzer-M, Buechler-J, Luy-J-F, Siart-U, Schmidhammer-E, Detlefsen-J, Esslinger-M.*

*Primary Examiner*—John B. Sotomayor
(74) *Attorney, Agent, or Firm*—MIchael J. Striker

(57) ABSTRACT

The present invention relates to a radar measuring device which, with a simple design, ensures reliable distance determination even when a mixed signal is zero, and a method for operating a radar measuring device. The radar measuring device includes:

A high-frequency oscillator (11) which emits two different carrier frequency signals (F1, F2),
A first switching device (14) for switching the carrier frequency signals (F1, F2) as a function of first pulse signals (P1) and emitting radar pulse signals (T1, 2),
A transmission antenna (16) and a receiving antenna (18),
A second switching device (24) for switching the carrier frequency signals as a function of a delayed second pulse signal (P2) and emitting delayed radar pulse signals (S1, 2),
A mixing device (21) for mixing received radar signals (R1, 2) with the delayed radar pulse signals (S1, 2) and emitting mixed signals (M1, 2).

The phase differences between the received radar signals (R1, 2) and delayed radar pulse signals (S1, 2) differ by a predetermined value when the two carrier frequency signals (F1, 2) are emitted. An amplitude signal is subsequently determined from the first and second mixed signal (M1, 2).

12 Claims, 1 Drawing Sheet

U.S. PATENT DOCUMENTS

| | | |
|---|---|---|
| 4,110,754 A | 8/1978 | Endo .......................... 342/201 |
| 4,521,778 A * | 6/1985 | Knepper ..................... 342/134 |
| 5,731,781 A * | 3/1998 | Reed .......................... 342/135 |
| 6,232,910 B1 * | 5/2001 | Bell et al. ..................... 342/70 |
| 6,804,168 B1 * | 10/2004 | Schlick et al. .............. 367/101 |
| 6,879,281 B1 * | 4/2005 | Gresham et al. .............. 342/70 |
| 6,940,447 B1 * | 9/2005 | Voigtlaender et al. ........ 342/70 |
| 2003/0052795 A1 * | 3/2003 | Schlick et al. .............. 340/903 |
| 2004/0061639 A1 * | 4/2004 | Voigtlaender et al. ........ 342/70 |
| 2005/0225476 A1 * | 10/2005 | Hoetzel et al. ............... 342/70 |

FOREIGN PATENT DOCUMENTS

WO 98/19177 5/1998

* cited by examiner

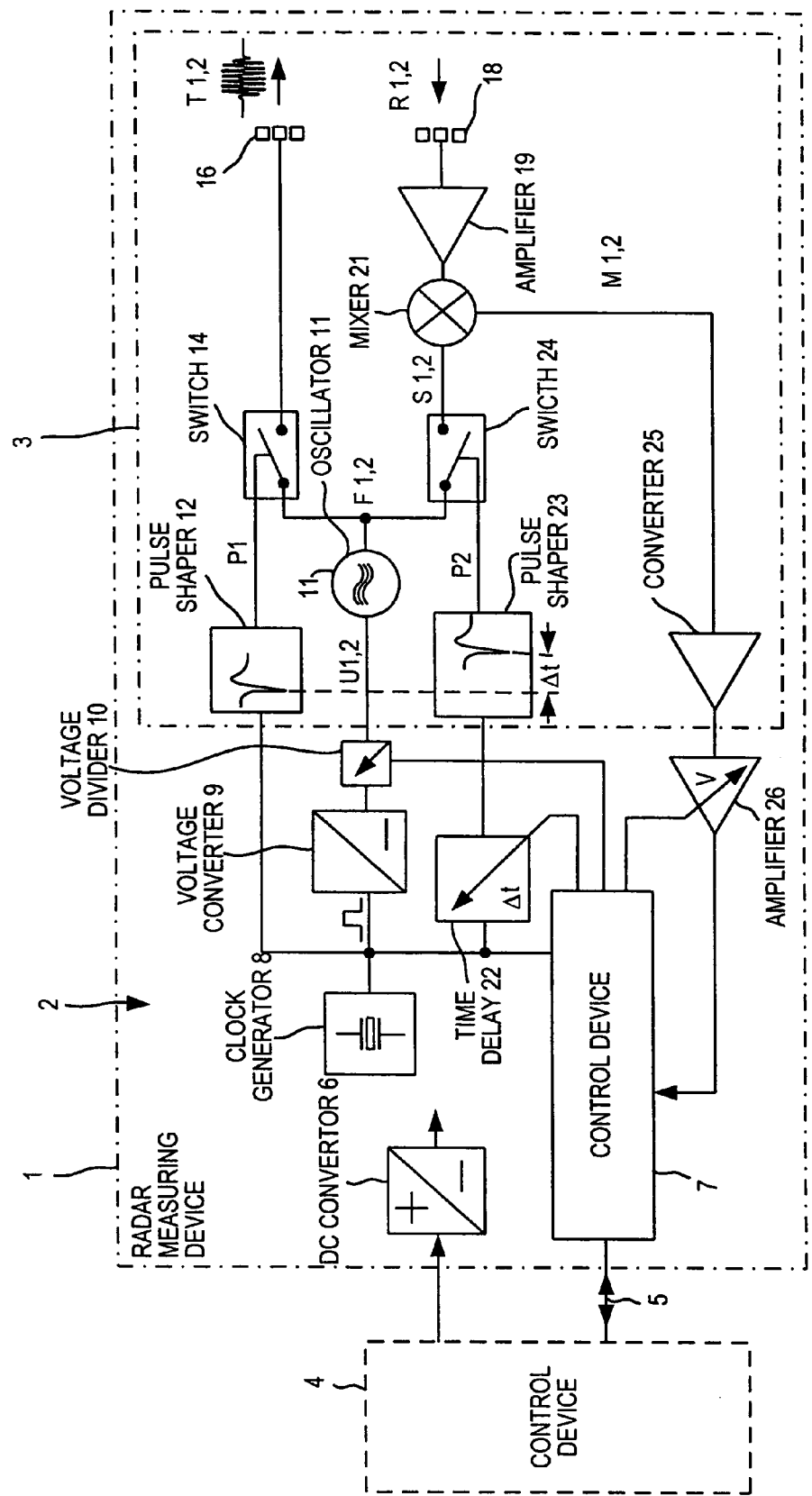

RADAR MEASUREMENT DEVICE, ESPECIALLY FOR A MOTOR VEHICLE, AND METHOD FOR OPERATING A RADAR MEASUREMENT DEVICE

The present invention relates to a radar measuring device which is usable in a motor vehicle in particular, and a method for operating a radar measuring device.

Radar measuring devices are used in motor vehicles in particular to measure the distance from and speed relative to other objects. Detection of a short range, up to approximately 10 m (short range radar, SRR), is currently carried out in frequency ranges of 10 to 70 GHz, for example. With pulse-echo radar systems and pulse-echo microwave sensors, a microwave signal is sent as a carrier at a first frequency in the form of a burst to a transmission antenna for a period of time. To this end, the carrier frequency signal of the HF oscillator is modulated by a first pulse signal when a switch which switches the carrier frequency signal through is triggered by the first pulse signal. The signal, which is reflected back to the sensor by a possible obstacle at a second frequency which is different from the carrier frequency due in general to the relative speed between the sensor and the obstacle, is received by the receiving antenna.

The carrier frequency signal is further modulated with a second pulse signal which is time-delayed relative to the first pulse signal, whereby the time delay is adjusted by an internal control device, which is generally a microcontroller or a digital signal processor. The delayed radar pulse signal generated by the modulation is mixed with the received radar pulse signal. An in-phase signal (I signal) is formed from the two signals at the output of the mixer, the I signal including a signal portion with the sum of the transmission and receiving frequency, and a signal portion with the difference between the transmission and receiving frequency.

The signal portion formed by the sum of the transmission and receiving frequency is suppressed due to the low pass which exists due to the printed circuit board capacitances, track resistances and external components. The only thing remaining at the output of the mixer, therefore, is the signal portion formed by the difference between the transmission and receiving frequency. The amplitude of the in-phase signal (I signal) generated by mixing can have a value located between a maximum positive amplitude and a maximum negative amplitude, e.g., including zero, depending on the phase position when the distance remains the same and/or is static. Amplitude values of zero or close to zero are not as relevant in dynamic conditions, i.e., when the motor vehicle is moving and/or if there is an obstacle, since they disappear if the distance value changes somewhat. In static conditions, e.g., when the radar measuring device is used as a parking aid, a further starting value is not available at first, however.

To enable determination of a distance value even when the I signal is zero, a second modulator is generally used to process the received radar pulse signals and delayed radar pulse signals, the modulator being phase-shifted by 90° and emitting a quadrature signal (Q signal). An amplitude signal is calculated in the control device from the I and Q signal as a geometric sum, using the formula:

$$U_{amplitude} = (I^2 + Q^2)^{0.5}$$

Using a calculation of this type, it is possible to determine the distance value even when the in-phase signal—which is determined without phase shifting—is zero. This requires a hardware outlay with two mixers for determining the in-phase signal and the quadrature signal, however.

In contrast, the radar measuring device according to the present invention, as recited in Claim 1, and the method according to the present invention, as recited in Claim 8, have the advantage that, when the received radar signals are processed, the distance can be reliably determined using just one measuring scale. In this case, the second mixer which determines the quadrature signal can be eliminated in particular without hindering detection of an obstacle when the mixed signal is zero due to interference.

The present invention is based on the idea that the phase-shifted measurement achieved with conventional IQ mixers is also made possible by using two different carrier frequencies. The second carrier frequency can advantageously be made available by the same oscillator by connecting it to a variable bias voltage, for example. As an alternative, it is also basically possible to use a plurality of, e.g., phase-coupled, oscillators, each of which emits a carrier frequency signal.

According to the present invention, the second carrier frequency in particular can be selected such that—corresponding to the IQ mixer of the state of the art—signals which are phase-shifted by 90° or π/2 are mixed. As a result, a maximum amplitude value of the second mixed signal is obtained when the first mixed signal is zero. A change in the phase difference which differs from this is also possible, however.

The wavelength is also changed by the two carrier frequencies via the relationship of the wavelength λ to frequency f. The following applies:

$$\lambda_1 * f_1 = \lambda_2 * f_2 = c$$

whereby $\lambda_1$ and $\lambda_2$ are the wavelengths of the first and second carrier frequency signal, and c is the speed of light. Wavelengths $\lambda_1$ and $\lambda_2$ are selected such that a measurement which is phase-shifted by 90° is achieved for the distance covered by the radar pulse signal, i.e., twice the value of the distance to the obstacle when $\lambda_1$ is zero, according to:

$$D = n * \lambda_1,$$

with D=distance, n=number of wavelengths for the second carrier frequency signal with wavelength $\lambda_2$. In other words:

$$D = n * \lambda_2 + 0.25 \lambda_2$$

Using the two equations for distance D, therefore, a relationship between wavelengths $\lambda_1$ and $\lambda_2$ and, accordingly, frequencies $f_1$ and $f_2$ can be calculated, so that second carrier frequency $f_2$ can be determined for a distance range checked by the radar measuring device, the second carrier frequency being adjusted by the control device of the radar measuring device. Advantageously, the two carrier frequencies are adjusted in alternating fashion. A distance range of, e.g., 0 to 30 m can be scanned in a manner known per se by changing the time delay of the second pulse signal, whereby a distance corresponding to the travel time of the light is assigned to each time delay. The two different carrier frequencies are sent out in succession for the particular distance values.

The present invention is explained in greater detail below with reference to the attached drawing based on an embodiment. The FIGURE shows a block diagram of a radar measuring device.

A radar measuring device 1 with an LF part 2 and an HF part 3 is connected with an external control device 4 of a motor vehicle via a data interface, e.g., a data bus 5.

Furthermore, external control device 4 outputs a supply voltage of, e.g., 8 volts, to a direct-current converter 6 of the radar measuring device 1, which generates the direct current required for the radar measuring device. A control device 7 which is connected to data bus 5 can be configured as a microcontroller or a digital signal processor (DSP), for example. A clock signal of, e.g., 5 MHz from a clock generator 8 is sent to a voltage source 9, 10 which includes an AC/DC converter 9 which emits a negative direct current, and a controllable voltage divider 10 which receives the negative direct current. As an alternative to controllable voltage divider 10, a controllable direct-current amplifier can also be provided, for example. A bias voltage U1, 2 output by controllable voltage divider 10 is adjusted by a control signal from control device 7 and sent to an HF oscillator 11. The fundamental frequency of HF oscillator 11 depends on bias voltage U1 and U2; two different carrier frequency signals F1, F2 are set at about 24 GHz by control device 7.

The clock signal is sent further to a first pulse-shaping device 12, which emits a pulse signal P1 to trigger a first diode switch 14 with a SRD (step recovery diode). First diode switch 14 switches the first carrier frequency signal F1 emitted by HF oscillator 11 through as a function of first pulse signal P1. Radar pulse signal T1, which is formed as a result, is emitted as a burst via a transmission antenna 16.

A radar pulse signal reflected by an obstacle is received—at a changed frequency due perhaps to Doppler shift—as radar signal R1 by a receiving antenna 18. Receiving antenna 18 and transmission antenna 16 can also be designed as combined and include a plurality of individual antenna regions or antenna patches. Received radar signal R1 is forwarded via an input amplifier 19 to a mixer 21.

The clock signal is forwarded to a second pulse-shaping device 23 via a time-delay device 22, the time delay Δt of which is adjusted by an analog output of control device 7. In a manner analogous to that of first pulse-shaping device 12, second pulse-shaping device 23 generates a second pulse signal P2 which triggers a second diode switch 24. Second diode switch 24 is therefore triggered by second pulse signal P2 with the time delay Δt relative to first diode switch 14. First carrier frequency signal F1, which is emitted by HF oscillator 11, is modulated in a diode switch 24 which functions as a second switching device. Radar pulse signal S1 which is formed as a result and is time-delayed relative to radar pulse signal T1 is also input via diode switch 24 to mixer 21, which convolutes signal S1 and amplified signal R1, i.e., it multiplies and integrates them. Mixed signal M1 formed by the convolution is input to control device 7 via an impedance converter 25 and a variable amplification device 26, the amplification of which is adjusted by an analog output of control device 7.

A corresponding measurement is then carried out at a second carrier frequency, which is different from the first carrier frequency: To this end, control device 7 sends a corresponding control signal to voltage divider 10, so that a second bias voltage U2 is sent to HF oscillator 11. HF oscillator 11 sends out a second carrier frequency signal F2. First pulse signal P1 closes first diode switch 14; as a result, a first radar pulse signal P1 is generated and sent out via transmission antenna 16. Receiving antenna 19 receives second incoming radar signal R2, which is mixed with a second delayed radar pulse signal S2 in mixer 21. As a result, a second mixed signal M2 is formed and sent to control device 7.

The control device successively scans a predetermined distance range of, e.g., 0 to 30 m by changing the time delay Δt in time-delay device 22, whereby the adjusted time delays correspond to different travel times of the emitted radar pulse signal T, in accordance with the speed of light. For each distance value, the first carrier frequency F1 and second carrier frequency F2 of HF oscillator 11 are then each adjusted by the analog signal output by control device 7 to voltage divider 10.

Control device 7 determines an amplitude value from measured signals M1 and M2. With an adjusted phase shift of $\pi/2$, a geometric sum is determined as the root of the sum of the squares of the measured signal. A simplified determination is possible, e.g., from a measurement of the maximum amplitude values of mixed signals M1 and M2 or by determining the sum of the amounts of M1 and M2.

What is claimed is:

1. A radar measuring device, in particular for a motor vehicle, with a high-frequency oscillating device (11) which emits a first carrier frequency signal (F1) and a second carrier frequency signal (F2),
    a first pulse-shaping device (12) which emits first pulse signals (P1),
    a first switching device (14) which switches the first and second carrier frequency signals (F1, F2) as a function of the first pulse signal (P1) and emits first and second radar pulse signals (T1, 2),
    a transmission antenna (16) which sends out radar pulse signals (T1, 2),
    a second pulse-shaping device (23) which emits second pulse signals (P2) which are delayed relative to the first pulse signals (P1),
    a second switching device (24) which switches the first and second carrier frequency signals (F1, F2) as a function of the second pulse signal (P2) and sends out first and second delayed radar pulse signals (S1, 2),
    a receiving antenna (18) which receives first and second radar signals (R1, R2),
    a mixing device (21) which mixes the received first and second radar signals (R1, 2) with the first and second delayed radar pulse signals (S1, 2) and emits first and second mixed signals (M1, 2),
    a control device (7) which determines an amplitude signal from the first mixed signal (M1) and the second mixed signal (M2), whereby a first phase difference between the first received radar signals (R1) and the first delayed radar pulse signals (S1) differs from a second phase difference between the second received radar signals (R2) and the second delayed radar pulse signals (S2).

2. The radar measuring device as recited in claim 1, wherein the high-frequency oscillating device (11) includes exactly one HF oscillator (11) capable of being adjusted by a trigger signal (U1, 2), the HF oscillator emitting the first or second carrier frequency signal (F1, F2) as a function of the trigger signal.

3. The radar measuring device as recited in claim 2, wherein the HF oscillator (11) adjusts a carrier frequency as a function of the amplitude of the trigger signal (U1, 1) and emits the carrier frequency signal (F1, F2).

4. The radar measuring device as recited in claim 3, wherein the trigger signal is a direct-current signal with at least a first and a second direct voltage (U1, 2).

5. The radar measuring device as recited in claim 4, wherein it includes a direct-voltage source (9, 10) which is capable of being adjusted by the control device (7) and emits the first and second direct voltage (U1, 2).

6. The radar measuring device as recited in claim 5,
wherein the adjustable direct-voltage source (9, 10) includes a voltage divider (10) capable of being adjusted via a control signal from the control device (7).

7. The radar measuring device as recited in claim 1,
wherein the mixer (21) convolutes the received radar signals (R1, 2) and the delayed radar pulse signals (S1, 2).

8. The radar measuring device as recited in claim 1, wherein it includes a time-delay device (22) with changeable time delay (Δt), which emits a delayed clock signal to the second pulse-shaping device (23).

9. The radar measuring device as recited in claim 8,
wherein the control device (7) scans a distance region between a minimum distance and a maximum distance by emitting a control signal to the time-delay device (22) and adjusts the various carrier frequency signals (F1, F2) while the distance region is being scanned.

10. A method for operating a radar measuring device, comprising the following steps:
Generate a first carrier frequency signal (F1),
Shape the initial pulse signals (P1),
Generate the first radar pulse signals (T1) from the pulse signal and the second carrier frequency signal (F1),
Send out the first radar pulse signals (T1),
Receive the reflected first radar signals (R1),
Shape the second pulse signals (P2), which are delayed relative to the first pulse signals (P1),
Generate the first delayed radar pulse signals (S1) from the first carrier frequency signal (F1) and the second pulse signal (P2),
Mix the first radar pulse signal (S1) and the received first radar signal (R1) and send out a first mixed signal (M1),
Generate a second carrier frequency signal (F2),
Generate second radar pulse signals (T2) from the first pulse signal (P1) and the second carrier frequency signal (F2),
Send out the second radar pulse signals (T2),
Receive reflected second radar signals (R2),
Generate second delayed radar pulse signals (S2) from the second carrier frequency signal (F2) and the second pulse signal (P2),
Mix the received second radar signals (R2) with the second delayed radar pulse signals (S2) and send out a second mixed signal (M2),
whereby a first phase difference located between the first received radar signal (R1) and the first delayed radar pulse signal (S1) is different than a second phase difference located between the second received radar signal (R1) and the second delayed radar pulse signal (S1),
Determine an amplitude signal from the first mixed signal (M1) and the second mixed signal (M2).

11. The method as recited in claim 10,
wherein the two carrier frequency signals (F1, 2) are generated by changing a direct voltage (U1, 2) which triggers an HF oscillator (11).

12. The method as recited in claim 11,
wherein the direct voltage (U1, 2) which triggers the HF oscillator (11) is produced using a controllable voltage divider (10).

\* \* \* \* \*